June 6, 1944.  P. L. MARDIS  2,350,911
TEMPERATURE INDICATOR
Filed June 18, 1942  2 Sheets-Sheet 1
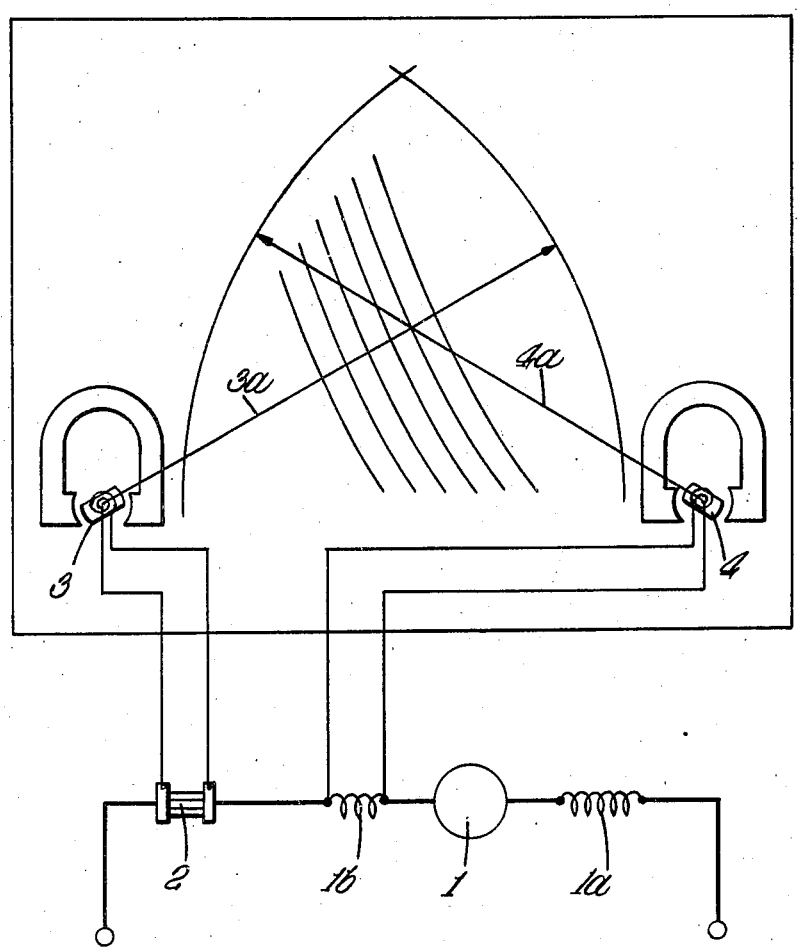
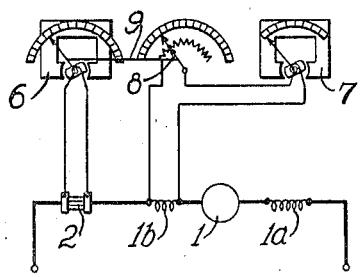
Inventor:
Paul L. Mardis
By Babcock & Babcock
Attorneys

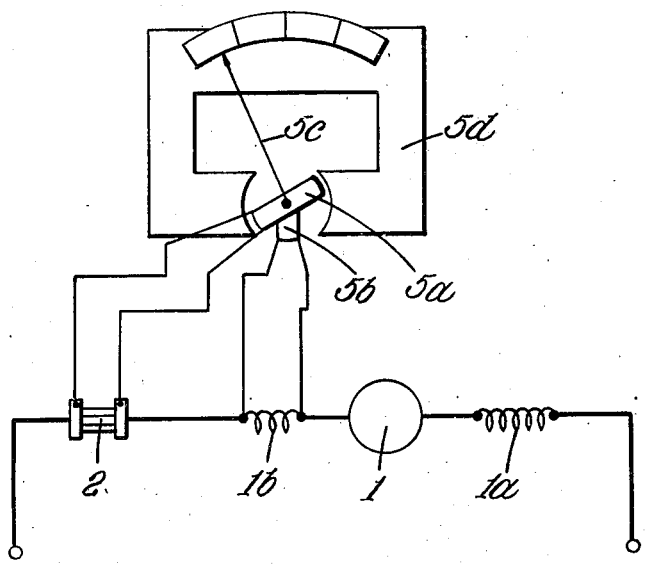
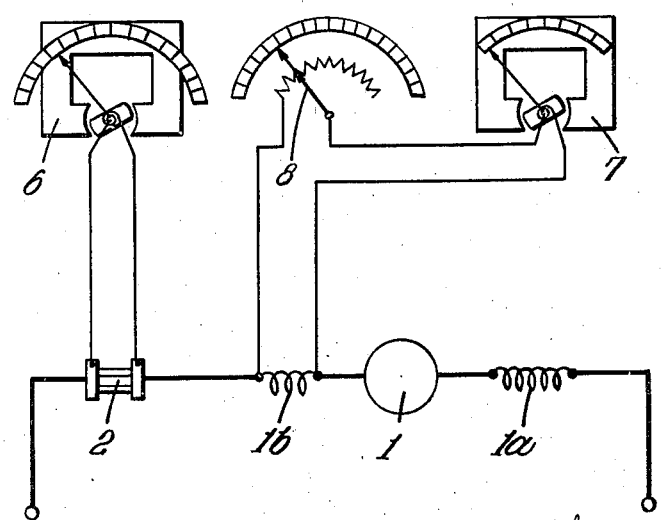

Patented June 6, 1944

2,350,911

UNITED STATES PATENT OFFICE 2,350,911

TEMPERATURE INDICATOR

Paul Lester Mardis, Ilkley, England, assignor to The English Electric Company Limited, London, England, a British company Application June 18, 1942, Serial No. 447,609
In Great Britain September 25, 1941

5 Claims. (Cl. 73—362)

This invention consists in an indicating device adapted to indicate the temperature of a winding of a piece of electrical apparatus while the winding is carrying current and without the use of a separate thermometer or pyrometer in heat association with the winding. The invention furthermore comprises an ammeter device responsive to the current flowing through the winding, a voltmeter device responsive to the potential difference across the winding and an indicator actuated in accordance with the ratio of the potential difference to the current, this indicator being calibrated to give a direct indication of the temperature of the winding. The ammeter device and voltmeter device may be combined into a quotient meter directly actuating means for giving an indication proportional to the ratio of potential difference to current.

The invention is particularly applicable to indicating the temperature of the windings of a dynamo electric machine during operation and in the case of a machine having a series field winding or an interpole winding the voltmeter device may be connected across one of these windings, the temperature of which moreover closely reflects the temperature of the armature of the machine.

Two forms of the invention using two different known electrical quotient meters to give an automatic indication of temperature are shown in Figs. 1 and 2 respectively of the accompanying drawings while another arrangement which, in its simplest form, requires manipulation in order to obtain a reading, is shown in Fig. 3. Figure 4 shows a further modification as a slight variation on Figure 3 in that the pointers or movable members of the ammeter 6 and the rheostat 8 are connected by a rigid link 9 which is suitably connected at its respective end portions to the respective pointers or movable members in such manner as to permit a pivoting or partial turning between the respective pointers or members and the respective end portions. In all the figures the invention is shown as applied to the indication of the temperature of a winding such as the interpole winding 1b of the dynamo electric machine 1 having also a series field winding 1a. In series with these windings is a shunt 2 of negligible temperature co-efficient, or at least having a negligible change of resistance during normal operation.

Fig. 1 shows a known form of quotient meter comprising an ammeter 3 and a voltmeter 4 mounted side by side with their axes parallel and with their pointers 3a and 4a moving in opposite senses about their respective axes but arranged to lie across each other over their full range of movement. The ammeter 3 is connected across the shunt 2 while the voltmeter 4 is connected across winding 1b. The point of intersection of the pointers 3a and 4a indicates on a calibrated scale the temperature of the winding 1b so long as current is passing therethrough.

It will be appreciated that other forms of quotient meter can be used. Thus in Fig. 2 the ammeter coil 5a lies transverse to the voltmeter coil 5b; these coils, rigidly attached together and to a pointer 5c, are pivotally mounted in known manner in a magnetic field provided by magnet 5d whereby they will turn about an axis transverse to the field and take up an angular position dependent on the ratio of the P. D. across coil 1b to the current therein and hence dependent on the resistance of coil 1b. The pointer 5c can thus indicate temperature on a calibrated scale.

In Fig. 3 the ammeter 6 and the voltmeter 7 are independent instruments with separate scales and the ammeter can be graduated to show the current flowing through the coil 1b. In series with the voltmeter there is however an adjustable rheostat 8 with a pointer moving over a scale graduated in amperes. When it is desired to read the temperature of coil 1b, the rheostat 8 is adjusted by hand to correspond to the ammeter reading; it will then insert in the voltmeter circuit a resistance proportional to the current in coil 1b. The reading of the voltmeter 7 will thus vary directly as the P. D. across and inversely as the current in the coil 1b; hence this instrument can be calibrated to show the temperature of winding 1b. This is a preferred form of the invention since it can be made up of three simple and standard pieces of apparatus and gives an indication both of current and temperatures.

In the modification illustrated in Figure 4, the construction and operation are the same as in the modification shown in Figure 3, except that the pointer or movable member of the rheostat 8, instead of being moved by hand, is moved automatically by the movement of the pointer of the ammeter 6. This is accomplished as by a rigid bar or link 9 which will have its respective end portions suitably connected in any suitable known manner, as by a pivotal connection, to the respective pointers or movable members of said ammeter 6 and rheostat 8 to permit a pivoting, or slight turning or rocking according as may be necessary, of the said pointers or movable members about their points of connection to said bar or link 9

What I claim as my invention and desire to secure by Letters Patent is:

1. A device for indicating the temperature of a winding in a piece of electrical apparatus while the winding is carrying current comprising a quotient meter incorporating means responsive to the potential difference across the winding, means responsive to the current flowing through the winding and an indicator actuated in accordance with the ratio of the potential difference to the current and calibrated to give a direct indication of temperature.

2. A device according to claim 1 in which the two responsive means and indicator are made up of an ammeter and a voltmeter with their pointers crossing each other in all positions over their full range of movement and a scale on which temperature is indicated at the point of intersection of these pointers.

3. A device according to claim 1 in which the two responsive means and indicator are made up of an ammeter and a voltmeter mounted side by side with their axes parallel and with their pointers moving in angularly opposite senses in substantially parallel planes and crossing each other in all positions over their full range of movement.

4. A device according to claim 1 in which the two responsive means and indicator comprise a voltage coil, a current coil transverse thereto, an indicating pointer, means for producing a magnetic field linked with the two coils, the coils and pointer being all secured together and pivotally mounted about an axis transverse to the magnetic field, and a scale—calibrated to show temperature—over which the pointer moves.

5. In combination with a piece of electrical apparatus and an ammeter in series with a winding in that apparatus, a device for indicating the temperature of the said winding while the winding is carrying current, comprising a voltmeter, electrical connections putting the voltmeter in parallel with said winding, a rheostat in series with the voltmeter and in parallel with the said winding, a pointer and a cooperating scale on the rheostat and a scale on the voltmeter, said scales being so calibrated that when the pointer on the rheostat gives an indication on the scale corresponding to the current in the said winding the voltmeter pointer indicates the temperature of the said winding.

PAUL LESTER MARDIS.